United States Patent
Liao

(10) Patent No.: US 7,403,691 B2
(45) Date of Patent: Jul. 22, 2008

(54) LIGHT GUIDE PLATE HAVING HIGH-DENSITY DOTS

(75) Inventor: Ming-Yi Liao, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 201 days.

(21) Appl. No.: 11/228,678

(22) Filed: Sep. 16, 2005

(65) Prior Publication Data

US 2006/0133111 A1   Jun. 22, 2006

(30) Foreign Application Priority Data

Dec. 21, 2004   (TW) .............................. 93139765 A

(51) Int. Cl.
   *G02B 6/10* (2006.01)
   *F21V 5/00* (2006.01)

(52) U.S. Cl. ................. 385/146; 362/307; 362/309; 362/317; 362/326; 362/327; 362/328; 362/329; 362/330

(58) Field of Classification Search ................. 385/146
   See application file for complete search history.

(56) References Cited

U.S. PATENT DOCUMENTS 5,363,294 A   11/1994 Yamamoto et al.
6,754,419 B2 *   6/2004 Ide et al. ........................ 385/120
2002/0041349 A1*   4/2002 Ohkawa ........................ 349/65
2004/0136077 A1*   7/2004 Leu et al. ...................... 359/599
2004/0212984 A1*   10/2004 Chen ............................ 362/31
2004/0239832 A1*   12/2004 Saito ............................ 349/74

FOREIGN PATENT DOCUMENTS

JP   M 2001-273805 A   10/2001

* cited by examiner

*Primary Examiner*—Frank G Font
*Assistant Examiner*—Ryan Lepisto
(74) *Attorney, Agent, or Firm*—Frank R. Niranjan

(57) ABSTRACT

A light guide plate (10) includes a pair of opposite incidence surfaces (101, 103), an emission surface (108) and a bottom surface (109) opposite to the emission surface. A plurality of dots (11) is distributed on the bottom surface, and each dot is shaped as a rectangle or a square with two cutouts formed at two opposite sides thereof respectively. Thus, a clearance between adjacent dots is relatively small. That is, a distribution of the dots is relatively compact, and this ensures that the light guide plate can provide emission of light beams with good uniformity. Furthermore, adjacent rows of dots are offset, and this can avoid bright lines. Thus, the light guide plate can provide improved display quality. Therefore, the light guide plate can be advantageously applied in back light systems of liquid crystal display devices.

8 Claims, 5 Drawing Sheets

LIGHT GUIDE PLATE HAVING HIGH-DENSITY DOTS

CROSS-REFERENCE TO RELATED APPLICATIONS

This application is related to commonly-assigned applications, which are application Ser. No. 11/228,944, entitled "LIGHT GUIDE PLATE HAVING HIGH-DENSITY DOTS", and filed on Sep. 16, 2005; and application Ser. No. 11/228,641, entitled "LIGHT GUIDE PLATE HAVING HIGH-DENSITY DOTS", and filed on Sep. 16, 2005.

BACKGROUND

1. Field of the Invention

The invention relates generally to light guide plates used in back light systems of liquid crystal display devices and, more particularly, to a light guide plate having high-density dots.

2. Discussion of Related Art

Back light systems are used in liquid crystal display devices for converting linear light sources such as cold cathode ray tubes, or point light sources, such as light emitting diodes, into area light sources having high uniformity and brightness.

A conventional back light system includes a light source, a light guide plate, a reflection plate, a diffusion plate and a prism sheet. The light source can be located beside one end or beside two opposite ends of the light guide plate and is used to emit incident light beams into the light guide plate. The light guide plate is used to lead travel of the incident light beams therein and ensure that most of the incident light beams can be emitted from an emission surface thereof. The reflection plate is located below a bottom surface of the light guide plate and is used to reflect some of the incident light beams that are emitted from the bottom surface into the light guide plate. This reflection enhances the utilization ratio of the incident light beams. The diffusion plate and the prism sheet are located on the emission surface of the light guide plate, in turn, and are used to improve uniformity of the emitted light beams.

As shown in FIG. 10, a conventional surface light source device includes a light guide plate 1, a line light source 2, an end edge reflection layer 4, a light diffusion layer 6, a white back face reflection layer 5, and a curved reflection plate 7. The line light source 2 is positioned on a first end edge of the light guide plate 1. The end edge reflection layer 4 is provided on a second end edge of the light guide plate 1, and the light diffusion layer 6 is provided upon a light emitting surface of the light guide plate 1. The white back face reflection layer 5 is provided on a back surface of the light guide plate 1. The curved reflection plate 7 is further provided to enclose the line light source 2 so as to effectively utilize light beams emitted by the line light source 2.

Furthermore, a light diffusion/transmission section 3 is provided on the back surface of the light guide plate 1. The light diffusion/transmission section 3 is formed by means, for example, of gravure printing, offset printing, and/or screen printing or transfer and, as formed, includes a plurality of dots. The dots can have arbitrary shapes such as round, square or chain dot-shapes, and are used to break up what would otherwise be a total reflection condition of the incident light beams. This light diffusion ensures that most of the light beams can pass through the light emitting surface of the light guide plate 1.

Referring to FIG. 11, a distribution of the dots on the back surface of the light guide 1 is shown. In a region from the first end edge of the light guide plate 1 to a position at which the surface emission luminance of the light guide plate 1 is lowest, the ratio of dot area of the light diffusion/transmission section 3 to the whole area of the back surface of the light guide plate 1 gradually increases with an increase in distance from the first end edge along a first direction. The first direction is perpendicular to the end edges of the light guide plate 1 and parallel to the side edges of the light guide plate 1. In a region from the position at which the surface emission luminance of the light guide plate 1 is lowest to the second end edge of the light guide plate 1, the ratio is constant along the first direction. The ratio of the dot area of the light diffusion/transmission section 3 to the whole area of the back surface of the light guide plate 1 is made constant along a second direction perpendicular to the first direction.

The light diffusion/transmission section 3 can enhance, to a certain extent, the uniformity of the emitted light beams from the light guide plate 1. However, two corners of the first end edge of the light guide plate 1 are electroshock areas of the line light source 2, and the brightness of the emitted light beams at the two corners is relatively low. Furthermore, a clearance between adjacent dots of the light diffusion/transmission section 3 is relatively big. That is to say, the distribution density of the dots is relatively small, and, as such, the light diffusion/transmission section 3 can't disperse light beams as effectively as would be desired. Thus, it is difficult to achieve entire or even substantial uniformity of the emitted light beams from the whole area of the light guide plate 1.

Furthermore, clearances between adjacent columns of dots are straight and tend to produce bright lines in use. Thus, the light guide plate 1 can't provide an optimal display quality.

What is needed, therefore, is a light guide plate that can provide emission of light beams with good uniformity.

What is also needed is a light guide plate that can provide improved display quality.

SUMMARY

In one embodiment, a light guide plate includes a pair of opposite incidence surfaces, an emission surface and a bottom surface opposite to the emission surface. A plurality of dots is distributed on the bottom surface, and each dot is shaped as a rectangle or as a square with two cutouts formed at two opposite sides thereof respectively. A distribution density of the dots at a middle area of the bottom surface, which is parallel to the incidence surfaces, and a distribution density of the dots at four corners of the bottom surface are larger than that at other area of the bottom surface. Each dot at the middle area and at the four corners is bigger than each dot located at other areas of the bottom surface. Furthermore, adjacent rows of dots can be offset.

Compared with a conventional light guide plate, a clearance between adjacent dots of the present light guide plate is relatively small. That is, a distribution of the dots is relatively compact, and this compact distribution ensures that the light guide plate can readily disperse light beams. Furthermore, the cutouts can enhance the utilization ratio of the incident light beams, thereby improving the uniformity of the emitted light beams. Thus, the emitted light beams tend to display good uniformity.

Secondly, the distribution density of the dots at the middle area of the bottom surface is relatively large, and each dot thereat is relatively big. This combination of dot distribution density and size further ensures that the light guide plate can disperse light beams effectively. Thus, the uniformity of the emitted light beams is further improved.

Thirdly, the distribution density and the size of the dots at the four corners of the bottom surface are each relatively large, thereby enhancing the brightness of the light beams emitted at the four corners. Thus, the uniformity of the emitted light beams, as a whole, is further improved.

Fourthly, adjacent rows of dots are offset, and this row patterning can help avoid bright lines. Thus, the present light guide plate can provide improved display quality Therefore, the present light guide plate can be advantageously applied in back light systems of liquid crystal display devices.

Other advantages and novel features of the present light guide plate will become more apparent from the following detailed description of preferred embodiments when taken in conjunction with the accompanying drawings.

BRIEF DESCRIPTION OF THE DRAWINGS

Many aspects of the present light guide plate can be better understood with reference to the following drawings. The components in the drawings are not necessarily to scale, the emphasis instead being placed upon clearly illustrating the principles of the present light guide plate. Moreover, in the drawings, like reference numerals designate corresponding parts throughout the several views.

Figure 1:
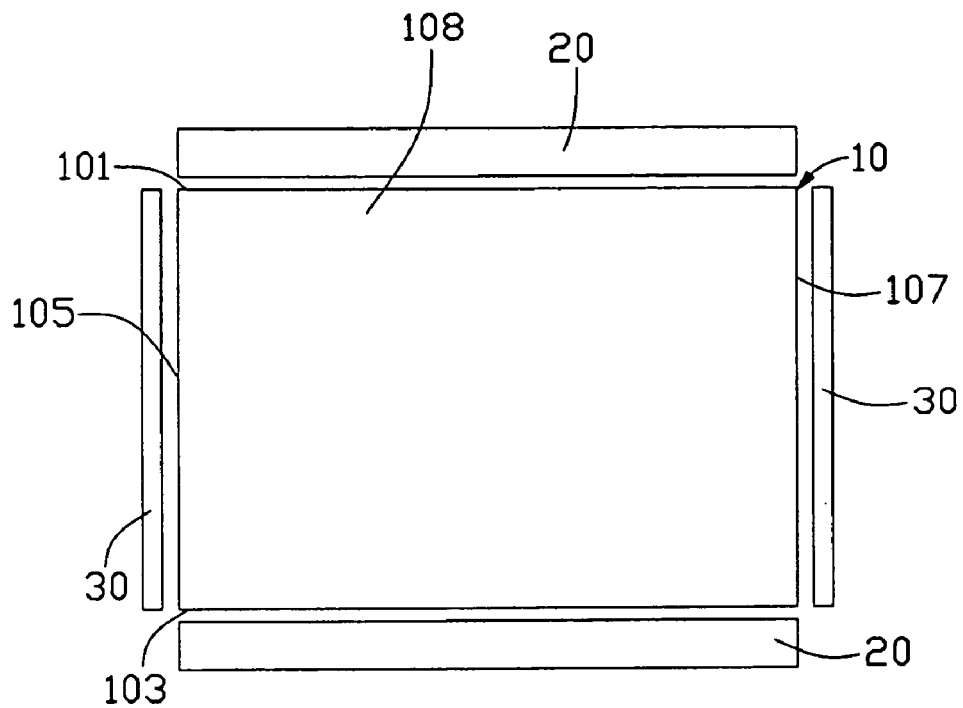
FIG. 1 is a schematic, top view of a light guide plate in accordance with a preferred embodiment of the present device, the light guide plate cooperating with a light source.

Corresponding reference characters indicate corresponding parts throughout the several views. The exemplifications set out herein illustrate at least one preferred embodiment of the present light guide plate, in one form, and such exemplifications are not to be construed as limiting the scope of the invention in any manner.

DETAILED DESCRIPTION OF PREFERRED EMBODIMENTS

Reference will now be made to the drawings to describe embodiments of the present light guide plate in detail.

Figure 2:
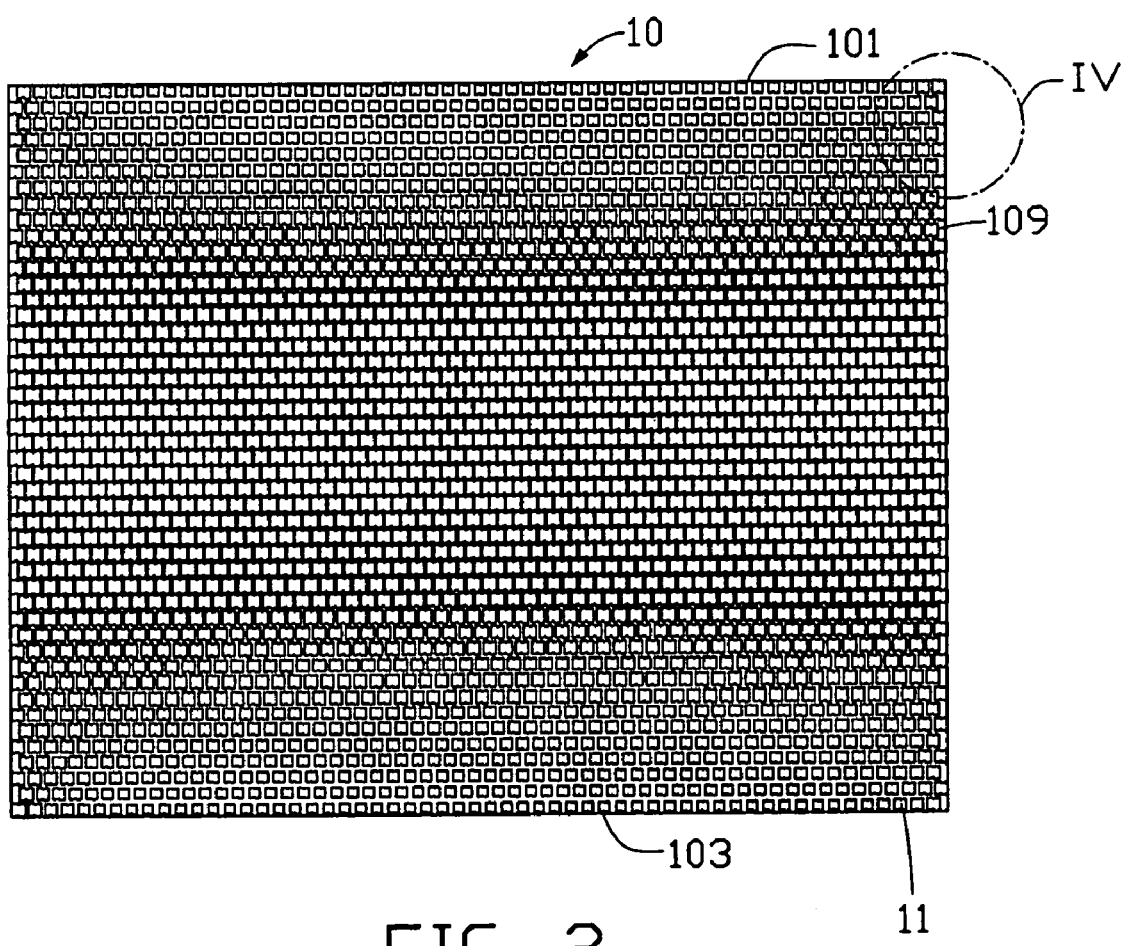
FIG. 2 is a schematic, bottom view of the light guide plate of FIG. 1, showing a plurality of dots distributed on a bottom surface thereof.
Figure 3:
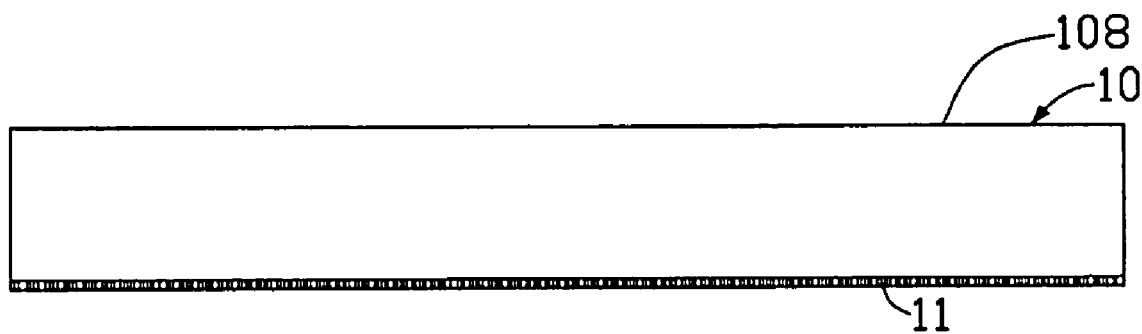
FIG. 3 is a schematic, side view of the light guide plate of FIG. 1.
Figure 4:
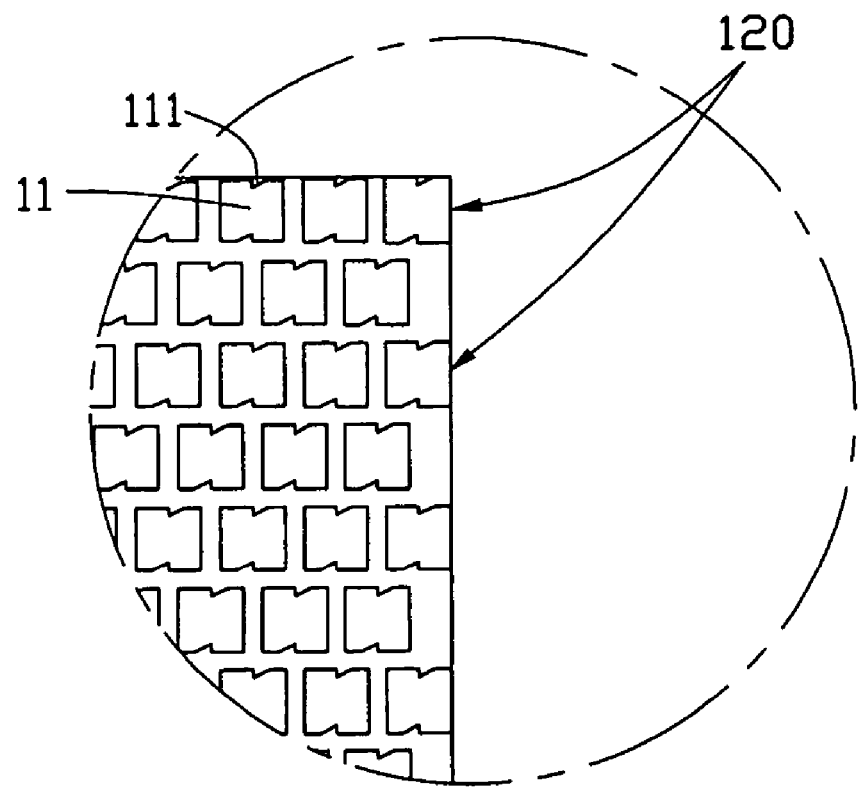
FIG. 4 is a schematic, partly enlarged view of FIG. 2, taken along line IV-IV.

Referring to FIGS. 1-4, in general, and FIGS. 1 and 4, in particular, a light guide plate 10 in accordance with a preferred embodiment of the present device is flat and includes a pair of opposite incidence surfaces 101, 103, an emission surface 108 and a bottom surface 109 opposite to the emission surface 108. A light source includes a pair of lamps 20 located beside the incidence surfaces 101, 103 respectively.

The light guide plate 10 is made of transparent material, such as acrylic resin, polycarbonate, polyethylene resin, or glass. The incidence surfaces 101, 103 are parallel to each other and are used to receive incident light beams emitted from the lamps 20 and lead them into the light guide plate 10. The emission surface 108 and the bottom surface 109 are parallel to each other and perpendicular to the incidence surfaces 101, 103. The emission surface 108 is used to lead/direct emitted light beams out of the light guide plate 10. The light guide plate 10 further has a pair of reflection plates 30 associated therewith. The reflection plates 30 are located beside two side surfaces 105, 107, respectively, of the light guide plate 10. Alternatively, the reflection plates 30 can take the form of reflective films coated on the two side surfaces 105, 107 thereof, respectively. The reflection plates 30/reflective films are used to reflect the light beams emitted from the side surfaces 105, 107 back into the light guide plate 10.

Referring to FIGS. 2, 3, a plurality of dots 11 are distributed on the bottom surface 109 of the light guide plate 10 by means of printing or injection. Each dot 11 can essentially be rectangular or square, thereby allowing for close packing of dots 11 via rows 120 and/or columns 122. In the one preferred embodiment of FIGS. 1-3, the dots 11 are square. Referring to FIG. 4, at least one cutout 111 is advantageously formed in at least one side of each dot 11, and, in the illustrated embodiment, a pair of such cutouts 111 is formed at two opposite sides of each dot 11, respectively. Each cutout 111 is an unsymmetrical V-shaped recess. A width of the cutout 111 is in the range from one eighth of a length of the side to a half thereof. A depth of the cutout 111 is in the range from one tenth of the length of the side to one fourth thereof. In the preferred embodiment, the width of the cutout 111 is one fourth of the length of the side, and the depth of the cutout 111 is one eighth of the length of the side.

When the incident light beams travel to the cutouts 111 of the dots 11, the incident light beams are reflected and diffused, thereby traveling along multiple directions and being emitted from the emission surface 108 of the light guide plate 10. This emission can enhance the utilization ratio of the incident light beams and can improve the uniformity of the emitted light beams.

The dots 11 are distributed on the bottom surface in multiple rows and multiple columns. Referring to FIG. 2, a distribution state of the dots 11 at the bottom surface 109 is as follows: a distribution density of the dots 11 at a middle area of the bottom surface 109 which is parallel to the incidence surfaces 101, 103 and a distribution density of the dots 11 at four corners of the bottom surface 109 are each larger than that at other areas of the bottom surface 109. Further, each dot 11 at the middle area and the four corners is bigger than each dot 11 at the other areas. Furthermore, a distribution density of the dots 11 at two ends of the middle area is the largest and the dots 11 thereat are the biggest. Therefore, the brightness of the light beams emitted from the four corners, the middle area is enhanced. Thus, the uniformity of the emitted light beams, as a whole, is further improved.

Figure 5:
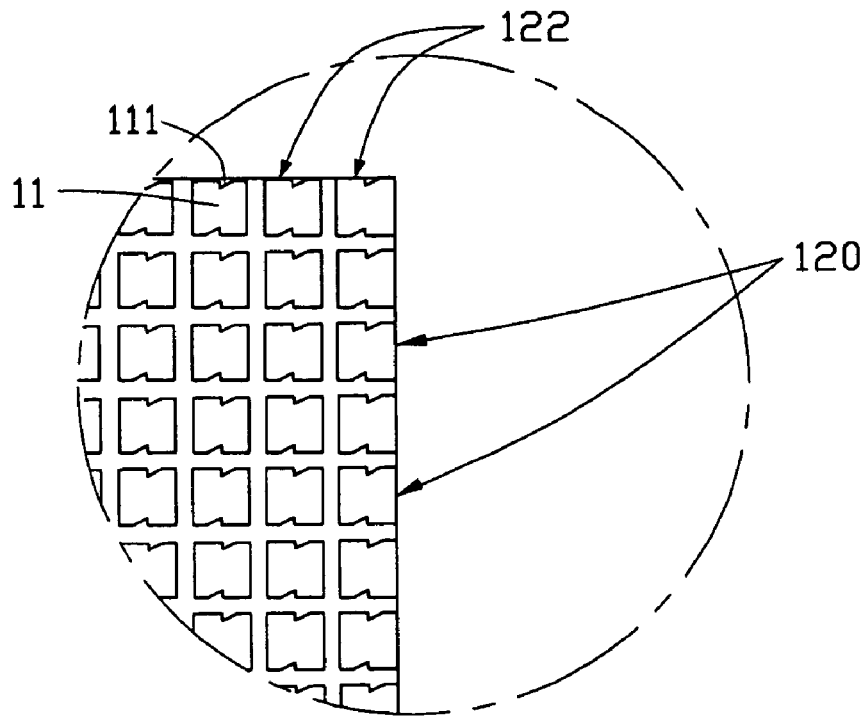
FIG. 5 is a schematic, partly enlarged view of an alternative dot distribution on the light guide plate.
Figure 6:
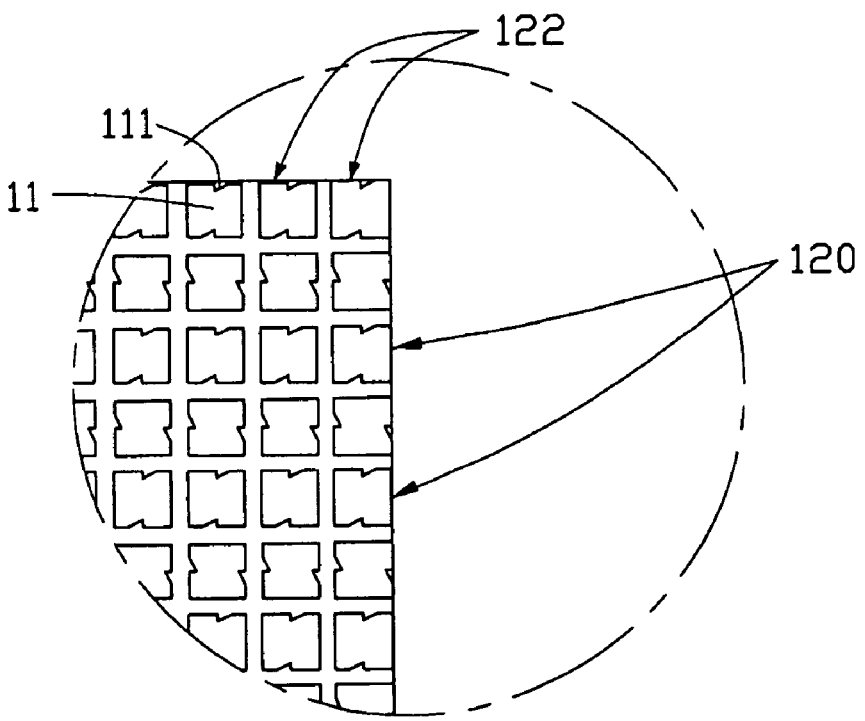
FIG. 6 is a schematic, partly enlarged view of a further alternative dot distribution on the light guide plate.
Figure 7:
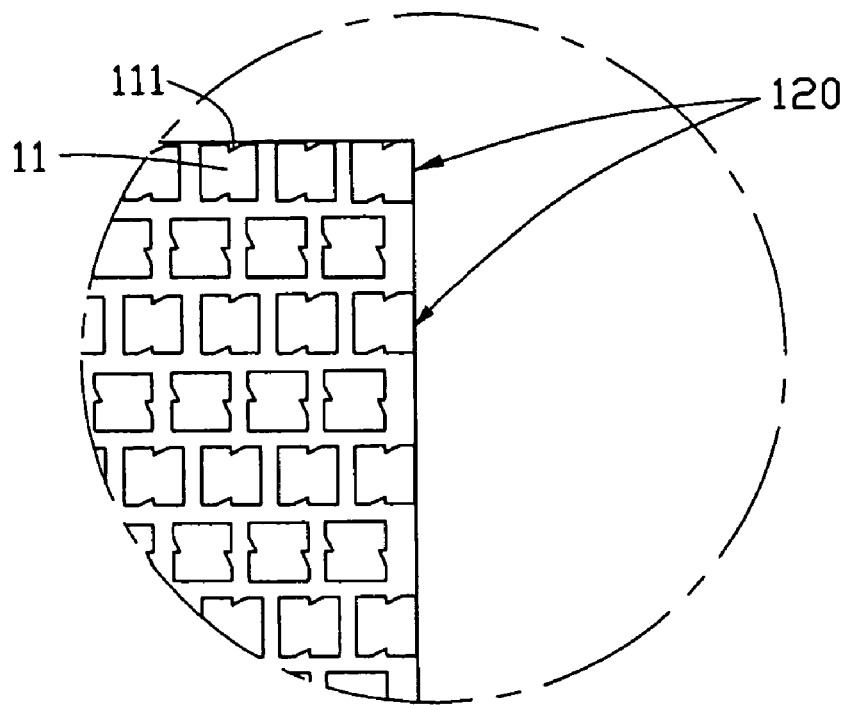
FIG. 7 is a schematic, partly enlarged view of a still further alternative dot distribution on the light guide plate.
Figure 8:
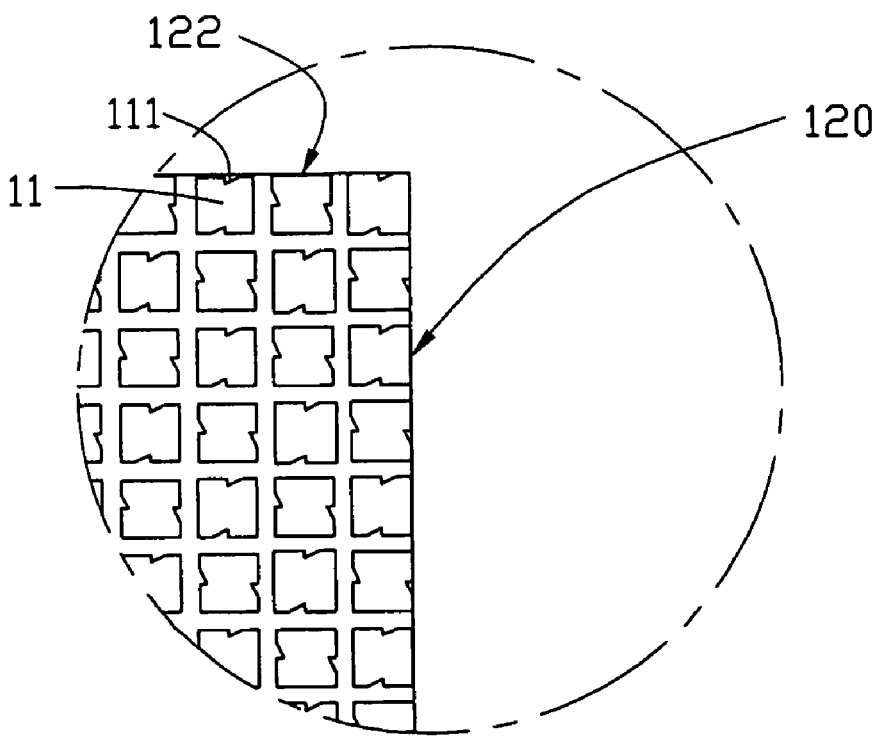
FIG. 8 is a schematic, partly enlarged view of a fifth kind of dot distribution on the light guide plate.
Figure 9:
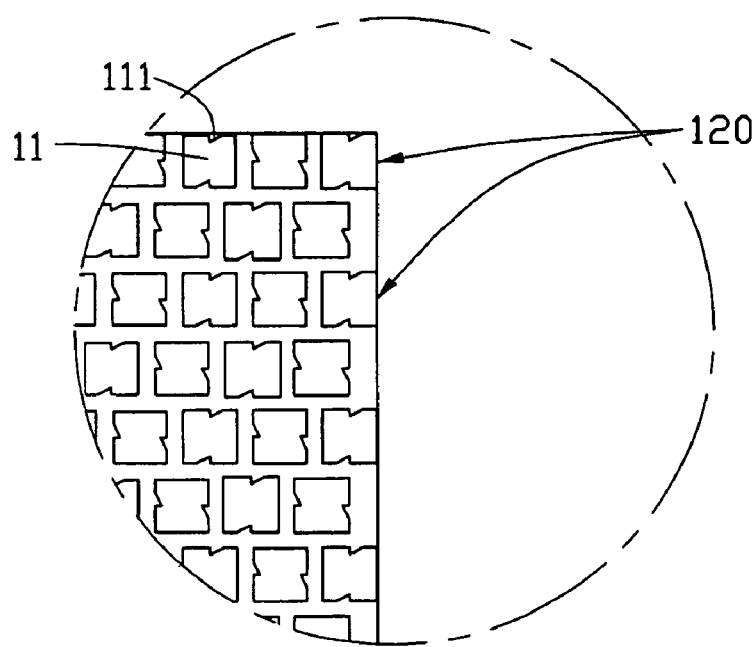
FIG. 9 is a schematic, partly enlarged view of a sixth kind of dot distribution on the light guide plate.
Figure 10:
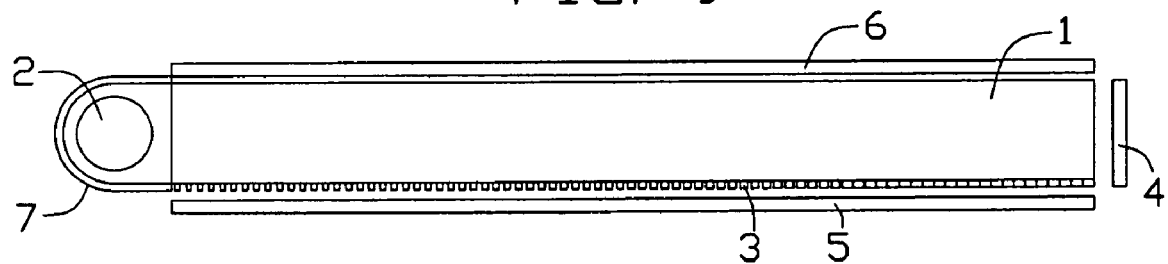
FIG. 10 is a schematic, side view of a conventional surface light source device.
Figure 11:
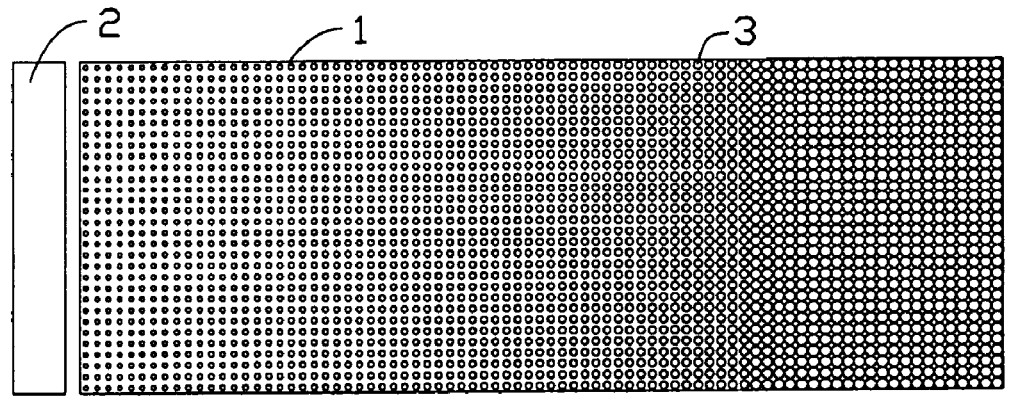
FIG. 11 is a schematic, bottom view of the surface source device of FIG. 10, showing a plurality of dots distributed on a bottom surface of a light guide plate thereof.

Referring to FIG. 4, in the preferred embodiment illustrated, adjacent rows 120 of dots 11 can be offset relative to one another, advantageously by a half of the length/width of the dot 11. It is to be further understood that any fractional amount of offset could potentially be used, including varying the degree (fractional amount of width and/or length of the dot 11) of offset used between adjacent pairs of rows 120 on a given bottom surface 109, and still be within the scope of present system. In fact, it is recognized that varying the offset between adjacent pairs of rows 120 could potentially enhance the utilization ratio of the incident light beams and/or help avoid bright lines. Alternatively, each column 122 of the dots 11 could have no offset and be within a same straight line, as shown in FIG. 5. The third kind of distribution, as shown in FIG. 6, is similar to the second kind of distribution in FIG. 5, except that the dots 11 at each column 122 are rotated relative to the symmetry of the dots, about 90 degrees, in turn, relative to any adjacent dot 11 within that particular column 122 and/or the dots 11 in adjacent column 122. Rotation of the dots 11 within adjacent columns and/or rows at an angle other than 90°, in order to aid the light utilization ratio, is also considered to be within the scope of the present system. The fourth kind of distribution, as shown in FIG. 7, is similar to the third kind of distribution in FIG. 6, except that adjacent rows 120 of dots 11 can be offset from one another, advantageously by a half of the length/width of the dot 11. The fifth kind of distribution, as shown in FIG. 8, is similar to the third kind of distribution in FIG. 6, except that the dots 11 at each row 120 are rotated 90 degrees, in turn, relative to any adjacent dot within that particular row 120 and/or the dots in adjacent rows 120. The sixth kind of distribution, as shown in FIG. 9, is similar to the fifth kind of distribution in FIG. 8, except that adjacent rows of dots 11 can be offset from one another, advantageously by a half of the length/width of the dot 11. While only offsetting of adjacent rows of dots 11 has been illustrated, the offsetting of adjacent columns of dots 11, additionally or alternatively, is also considered to be within the scope of this system.

Compared with a conventional light guide plate, each dot 11 of the present light guide plate 10 is rectangular or square and has a pair of cutouts 111 formed at two opposite sides thereof, thus a clearance between adjacent dots 11 is relatively small. Accordingly, a distribution of the dots 11 is relatively compact, and this compactness ensures that the light guide plate 10 can disperse light beams in a preferable and effective manner. Furthermore, the cutouts 111 can enhance the utilization ratio of the incident light beams thereby improving the uniformity of the emitted light beams.

Secondly, the distribution density of the dots 11 at the middle area of the bottom surface 109 is relatively large, and each dot 11 thereat is relatively big. This dot density and size further ensures that the light guide plate 10 can disperse light beams preferably. Thus, the uniformity of the emitted light beams is further improved.

Thirdly, the distribution density of the dots 11 at the four corners of the bottom surface is relatively large, and each dot 11 thereat is relatively big. As such, the brightness of the light beams emitted at the four corners is enhanced. Thus, the uniformity, as a whole, of the emitted light beams is further improved.

Fourthly, adjacent rows of dots 11, as shown in FIGS. 4, 7, 9 can be offset to help avoid bright lines. Thus, the light guide plate 10 can provide improved display quality.

Therefore, the present light guide plate 10, incorporating all or some of the above-mentioned features, can be advantageously applied in back light systems of liquid crystal display devices.

In addition, the present light guide plate 10 can be wedge-shaped and the dots 11 can be distributed, additionally or alternatively, on the emission surface 108, using any of the various dot distributions discussed with respect to FIGS. 4-9. Each light source or lamp 20 can, for example, be in the form of an incandescent or fluorescent lamp, a field emission device, a CRT (cathode ray tube), a LED (light emitting diode), or a plurality of LEDs. When the light source 20 is a lamp, a distribution state of the dots 11 at the bottom surface 109 is, advantageously, as follows: a distribution density of the dots 11 at an area near to the lamp 20 is smaller than that at other area far from the lamp 20, and the dots 11 at the area near to the lamp 20 is smaller than that at the other area far from the lamp 20.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

I claim:

1. A light guide plate comprising:
   at least one incidence surface;
   an emission surface;
   a bottom surface opposite to the emission surface; and
   a plurality of dots distributed on the bottom surface, each dot being square, each dot further having at least one cutout formed in at least one side thereof, wherein each of the at least one cutout is an unsymmetrical V-shaved recess.

2. The light guide plate as claimed in claim 1, wherein a width of the cutout is in the range from one eighth of a length of the side to a half thereof, and a depth of the cutout is in the range from one tenth of the length of the side to one fourth thereof.

3. The light guide plate as claimed in claim 2, wherein the width of the cutout is one fourth of the length of the side, and the depth of the cutout is one eighth of the length of the side.

4. A light guide plate comprising:
   at least one incidence surface;
   an emission surface;
   a bottom surface opposite to the emission surface; and
   a plurality of dots distributed on the bottom surface, each dot being one of rectangular and square, each dot further having at least one cutout formed in at least one side thereof, the bottom surface having a parallel middle area, the parallel middle area being parallel to the at least one incidence surface, a distribution density of the dots at the parallel middle area being larger than that at another area of the bottom surface, the dots at the parallel middle area being bigger than the dots at the another area of the bottom surface, and a distribution density of the dots at two ends of the parallel middle area being largest, and the dots thereat being biggest.

5. A light guide plate comprising:
   at least one incidence surface;
   an emission surface;
   a bottom surface opposite to the emission surface; and
   a plurality of dots distributed on the bottom surface, each dot being one of rectangular and square, each dot further having at least one cutout formed in at least one side thereof, wherein the dots are distributed on the bottom surface in multiple rows and multiple columns, each column of the dots is within a same straight line, and the dots within each column are rotated an angular amount, in turn, relative to at least one of adjacent dots within the same column and the dots in adjacent columns.

6. The light guide plate as claimed in claim 5, wherein adjacent rows of dots we offset a fractional amount of at least one of a length and a width of the dots.

7. The light guide plate as claimed in claim 5, wherein the dots in each row are rotated an angular amount in turn relative to at least one of adjacent dots within the same row and the dots in adjacent rows.

8. The light guide plate as claimed in claim 7, wherein adjacent rows of dots are offset a fractional amount of at least one of a length and a width of the dots.

* * * * *